United States Patent
Russak et al.

(10) Patent No.: US 7,213,969 B2
(45) Date of Patent: May 8, 2007

(54) AXILLARY THERMOMETER

(75) Inventors: Stephen Russak, Fort Lee, NJ (US); Andrew Howansky, Copake Falls, NY (US); Jim Best, Weehawken, NJ (US); Scott Henderson, Brooklyn, NY (US); Timothy Kennedy, Staten Island, NY (US); Daniel Formosa, Montvale, NJ (US); Wilfrido L. Canizares, Brooklyn, NY (US)

(73) Assignee: Kaz, Incorporated, New York, NY (US)

( * ) Notice: Subject to any disclaimer, the term of this patent is extended or adjusted under 35 U.S.C. 154(b) by 0 days.

(21) Appl. No.: 10/722,590

(22) Filed: Nov. 25, 2003

(65) Prior Publication Data

US 2004/0170216 A1    Sep. 2, 2004

Related U.S. Application Data

(60) Provisional application No. 60/428,823, filed on Nov. 25, 2002.

(51) Int. Cl.
*G01K 1/00* (2006.01)
*G01K 7/00* (2006.01)
*A61B 5/00* (2006.01)

(52) U.S. Cl. .................. 374/208; 374/170; 374/163; 374/183; 600/549

(58) Field of Classification Search ............... 374/208, 374/151, 163, 170, 100, 183; 600/549; 116/216; D10/57
See application file for complete search history.

(56) References Cited

U.S. PATENT DOCUMENTS

| | | | | |
|---|---|---|---|---|
| 3,165,929 | A | * | 1/1965 | Noller ................... 374/183 |
| D308,172 | S | * | 5/1990 | Ishikawa et al. ......... D10/57 |
| D310,037 | S | * | 8/1990 | Aoki et al. ............. D10/57 |
| D311,144 | S | * | 10/1990 | Kida ..................... D10/57 |
| 5,013,161 | A | * | 5/1991 | Zaragoza et al. ........ 374/208 |
| 5,178,468 | A | * | 1/1993 | Shiokawa et al. ........ 374/185 |

(Continued)

FOREIGN PATENT DOCUMENTS

JP          361270631 A  *  11/1986

(Continued)

OTHER PUBLICATIONS

Spanish Patent and Trademark Office Report on the State of the Art for Spanish Application No. 200401461, dated Nov. 13, 2006.

*Primary Examiner*—Gail Verbitsky
(74) *Attorney, Agent, or Firm*—Darby & Darby

(57) ABSTRACT

An axillary thermometer for measuring the temperature of a patient comprising a first disk-shaped member having a circumferential edge, and an upper portion and lower portion, that is integrally connected, and angularly situated, via a connecting member joint, to a second disk-shaped member having a top side and a bottom side. The top side of the second disk-shaped member, including an actuation switch and display, being proximate the upper portion of the first disk-shaped member such that viewing of the temperature display can be simultaneously accomplished with the temperature taking process. The first disk-shaped member further having at least one temperature sensor along its circumferential edge of the upper portion with the at least one temperature sensor being connected to at least one temperature sensing circuitry.

15 Claims, 3 Drawing Sheets

U.S. PATENT DOCUMENTS

| | | | |
|---|---|---|---|
| D347,584 S * | 6/1994 | Vogelpohl | D10/50 |
| 5,401,100 A | 3/1995 | Thackston et al. | |
| D356,965 S * | 4/1995 | Chang | D10/62 |
| 5,454,835 A * | 10/1995 | Wu | 606/235 |
| 5,874,736 A | 2/1999 | Pompei | |
| 5,893,833 A | 4/1999 | Pompei et al. | |
| 6,036,361 A | 3/2000 | Gregory et al. | |
| 6,045,257 A | 4/2000 | Pompei et al. | |
| D423,956 S * | 5/2000 | Chen | D10/57 |
| 6,241,384 B1 | 6/2001 | Pompei et al. | |
| 6,241,385 B1 | 6/2001 | Hof | |
| 6,402,371 B2 | 6/2002 | Pompei et al. | |
| 6,419,388 B2 | 7/2002 | Lee | |
| 6,420,184 B1 | 7/2002 | Hof | |
| 6,637,935 B2 * | 10/2003 | Chen | 374/185 |
| D490,327 S * | 5/2004 | Lussier et al. | D10/57 |
| 7,052,471 B2 * | 5/2004 | Lussier et al. | 600/549 |
| 7,060,037 B2 * | 6/2006 | Lussier et al. | 600/549 |
| 2004/0146087 A1 * | 7/2004 | Penney et al. | 374/170 |
| 2004/0170216 A1 | 9/2004 | Russak et al. | |
| 2005/0094703 A1 * | 5/2005 | McConnell et al. | 374/101 |
| 2005/0192512 A1 * | 9/2005 | Butterworth | 600/549 |

FOREIGN PATENT DOCUMENTS

| | | |
|---|---|---|
| JP | 02262025 A | 10/1990 |
| WO | WO-9721081 | 6/1997 |
| WO | WO-9859227 A1 | 12/1998 |

* cited by examiner

AXILLARY THERMOMETER

The present application claims the benefit of U.S. patent application Ser. No. 60/428,823, filed Nov. 25, 2002, which is hereby incorporated by reference in its entirety.

FIELD OF THE INVENTION

The present invention generally relates to the field of thermometers, and more specifically to an axillary thermometer.

BACKGROUND OF THE INVENTION

Electronic medical thermometers that estimate a patient's body temperature have been in common use in the medical community for a number of years. From neonates to the elderly, measuring body temperature can be a critical factor in the treatment of problems or diseases of patients. Thus, determining an individual's body temperature in an accurate, and noninvasive manner is essential to providing proper care to a patient. However, a patient views the temperature taking process as intrusive and uncomfortable, especially the neonate.

In the past, electronic thermometers typically included an elongated probe that contained a thermal resistor (thermistor) within the tip of the probe. The traditional digital "stick" thermometers were usually designed for three-way use in the oral, rectal, and axillary regions. A hygienic cover would be placed over the tip of the probe where the thermistor was situated, or utilized without a cover and subsequently cleaned in an alcoholic bath, then the probe would be applied to the particular location on the patient's body. From there, the temperature of the thermistor and probe would begin to rise toward the patient temperature and the thermometer would use algorithms to process the thermistor signal and predict the temperature of the patient. The predicted temperature of the patient would be displayed on the thermometer before the thermistor's temperature would actually reach that predicted temperature. Other sensors conventionally in use similarly utilize a thermistor, however rather than using prediction algorithms they convert the actual measured resistance in the thermistor into a temperature which is displayed to a user.

Traditional glass and mercury-filled thermometers typically take about three minutes in order to obtain an accurate temperature of an individual. The prediction algorithms used in electronic thermometers provide reasonably accurate temperature predictions within about 30 seconds after the thermometer is applied to the patient's body. The long measurement time for a glass thermometer is mainly due to the heat capacity of the glass probe and also due to the reduction in temperature of the tissue in the immediate area where the probe is applied.

Although existing electronic thermometers have proven successful in reducing measurement times and obtaining an accurate temperature of an individual, there is a need for an improved electronic thermometer that is site-specific to the axillary region, provides for greater comfort to patients, and increases the accuracy and speed with which the temperature is measured.

SUMMARY OF THE INVENTION

The present invention relates to a thermometer that is designed to obtain and display axillary temperature measurements. The axillary thermometer of the present invention, unlike the traditional electronic thermometers, is site-specific in that it is designed to take the temperature of an individual via the axillary region. The thermometer of the present invention is designed to have a shape that improves the temperature taking process. The shape of the thermometer allows for improved placement of the thermometer into the axillary region and an improved ability of the thermometer to remain securely in place in the axillary region. This results in increased comfort for the patient, improved sensing capabilities, and a more accurate temperature determination.

In accordance with one embodiment of the present invention, the axillary thermometer includes a curved or disk-shaped housing containing a temperature sensor and the temperature sensing circuitry. Alternatively, the temperature sensing circuitry may be external to the disk-shaped housing, or may be situated within the main housing. The temperature sensor is situated on the top side of the thermometer along the circumference of the disk-shaped housing. The temperature sensor, however, can be situated along any portion of the circumference of the disk-shaped member. The temperature sensor and sensing area, or the overall unit itself, are washable so that the thermometer may be repeatedly used on different individuals without worrying about cross contamination. Alternatively, a disposable cover may be placed over the sensor for sanitary purposes.

Proper positioning and contacting of the temperature sensor in the axillary region is critical to accurate and fast temperature measurements. For this reason, the temperature sensor is preferably designed to be arc or tubular in shape. An arcuate shape allows the temperature sensor to conform to an individual's curves in the axillary region and provides a large surface area for contacting the sensor to the body, thus ensuring faster and more accurate temperature measurements than a shape which does not conform to the axillary contours. Similarly, a sensor having a tubular shape and bent at a midpoint (resembling a suitcase or briefcase handle) provides a large contacting surface area between the sensor and the axillary region while still providing increased comfort to the patient. Alternatively, the sensor may be designed to resemble conventional sensors having a conical nose shape.

The shape of the member housing the temperature sensor also adds to the accuracy and speed with which a temperature measurement is obtained. The disk-shaped member can more easily slide into the axillary region, is positioned deep within the axillary pocket, and yields more comfort for a patient than a similarly functioning square or finger-shaped member. The disk-shaped housing for the temperature sensor is designed to improve the temperature taking process. The disk shape naturally aligns itself within the axillary region and therefore improves the sensing capabilities of the thermometer. Preferably, the thickness of the disk-shaped housing for the temperature sensor is greater at the top of the disk, where the temperature sensor is located and where the apex of the armpit will lie, than the bottom of the disk which is proximate to the ribcage when the thermometer is placed in the axillary region. Such a design is preferred for the restless child who is constantly shifting their body positions because once the thermometer is in the axillary region and the arm is brought down over the thermometer, the thermometer is more likely to stay in place than a conventional digital stick thermometer. Also, the disk shape provides for more comfort to the patient while a temperature is being taken.

In one embodiment, a second disk-shaped member constituting the main housing of the thermometer is connected to and extends perpendicularly from the disk-shaped housing for the temperature sensor. A connecting member is used to connect the main housing to the disk-shaped housing. The main housing provides a large surface area that is ideal for handling the thermometer and contains the on/off button and the temperature display unit. The on/off button is pressed once to activate the thermometer's temperature sensing mechanism and the temperature display unit. The thermometer is self-calibrated each time the on/off button is pressed to turn the unit on to further ensure that accurate temperature measurements are taken. The thermometer is turned off by pressing the on/off button a second time. The temperature display unit provides the user with digitally displayed readouts of an individual's body temperature, and can be read simultaneously with the process of taking the temperature of an individual.

The main housing, wherein the on/off button and temperature display unit are preferably situated, is connected to the temperature sensing housing via a connecting member joint. The connecting member joint can be made from any rigid low thermal-conductivity material. The connecting member can also be utilized as the handle for placement into the axillary region by placing one's fingers on the sides of the temperature display unit and curving the fingers over and about the connecting member so that the tips of the fingers are on the underside of the temperature display unit. Such a form of handling the thermometer is ideal for self-administered temperature determinations.

The complete housing of the thermometer, main member and member that holds the sensor, is preferably formed using a low thermal-conductivity material so that cooling of the patient's skin upon contact is minimized, and also so that the temperature sensor does not experience improper fluctuations in temperature caused by interferences such as ambient air temperatures.

In accordance with another embodiment of the present invention, the axillary thermometer is provided with gripping pads and includes a disk-shaped housing containing a temperature sensor and the temperature sensing circuitry. A second disk-shaped member constituting the main housing of the thermometer is connected to and extends perpendicularly from the disk-shaped housing for the temperature sensor. The main housing of the thermometer is provided with gripping pads. The pads are affixed to the outer rim and top edges of the main housing disk on opposite sides of the temperature display and on/off button. The pads can be formed from any material that will allow for easy handling and a sure grip of the thermometer when it is being used, such as thin strips of rubber or neoprene. The pads are affixed to the main housing using an adhesive substance or can be manufactured with an adhesive substance previously disposed on the underside thereof. Optionally, the gripping pads are formed onto the main housing of the axillary thermometer using a conventional overmolding or an injection molding process.

In accordance with another embodiment of the present invention, the axillary thermometer includes a disk-shaped housing containing a temperature sensor and the temperature sensing circuitry, in which the connecting member joint, which joins the disk-shaped housing for the temperature sensor and the main housing of the thermometer, is molded from a flexible, rather than rigid, material such as rubber or a light plastic. The flexibility of the connecting member joint increases the comfort to the individual the thermometer is being used on, and allows for improved contacting of the temperature sensor to the axillary region.

In accordance with another embodiment of the present invention, the axillary thermometer comprises an arc-shaped elongated probe that is disposed with a sensor near the tip. A disk-shaped member constituting the main housing of the thermometer is connected to the arc-shaped elongated probe. The arc-shaped probe end of the thermometer allows for easy placement of the thermometer into the axillary region and is ideal for sliding into the axillary region through a shirtsleeve opening, so that disrobing is unnecessary.

In accordance with another embodiment of the present invention, the thermometer comprises a one-piece housing design that is disk-shaped. Within the housing is the temperature sensing, temperature display, and power circuitry. The on/off button and the temperature display unit are provided on the top side of the disk-shaped housing. The temperature sensor is provided on the circumference of the housing, directly above and proximate to the temperature display. The temperature sensor is placed in contact with the axillary region to obtain the temperature thereof. The temperature sensor produces an electronic signal that represents the body temperature obtained from the axillary region. The electronic signal of the sensor is then transmitted to a processor which converts the electronic signal into a temperature reading. The temperature reading is then transmitted to the temperature display unit where the temperature is displayed in degrees Fahrenheit or Celsius.

In accordance with another embodiment of the present invention, the axillary thermometer comprises a disk-shaped housing containing a temperature sensor and the temperature sensing circuitry. Extending from the disk-shaped member housing the temperature sensor, via a connecting member joint, is a rubber coated cylindrically shaped handle with comfort/finger grooves on its underside and an on/off switch and temperature display unit on its top side. Alternatively, the temperature sensing circuitry may be contained within the cylindrically-shaped handle.

In accordance with another embodiment of the present invention, the axillary thermometer is designed to be a multiple sensor thermometer. It has been determined that the temperature hot zone (the area of the axillary region which provides the most accurate temperature readings) for adults is more toward the rear of the axillary region than for a neonate. The multiple sensor thermometer is disposed with multiple temperature sensors along a probe that reads the temperature at multiple points and then displays the highest reading as the actual temperature. The multiple sensor design provides the most accurate temperature reading and eliminates the problems associated with lining up the probe in the hot zone of the axillary region.

In accordance with another embodiment of the present invention, the axillary thermometer is designed to be a constant depth thermometer. The constant depth thermometer design allows the thermometer to be inserted at a fixed depth every time, allowing for consistent temperature sensor placement. The connecting member joint is adapted to allow the disk-shaped member housing the temperature sensor to slideably extend and retract with respect to the main housing of the thermometer through the use of a lockable slide. The lockable slide is unlocked by depressing a button situated on a bottom portion of the slide so that the button does not project through holes of an interconnected top portion, thereby allowing for extension or retraction of the connecting member joint. The lockable slide is locked at a desired position by allowing the spring-loaded button to protrude through the holes of the top portion. The slideably positionable connecting member joint allows a user to extend or retract the sensor housing to a predetermined position for a particular individual. For example, the different locking holes may correspond to different positions for a neonate or an adult. Also, having a slideably positionable connecting member joint allows the user to position the housing for the temperature sensor deeper within the axillary pocket, without having to remove the thermometer from the axillary region.

In accordance with another embodiment of the present invention, the axillary thermometer is designed so that the temperature sensor is positionable along any point of the circumference of the disk-shaped housing. Different patients have varying dimensions within their axillary regions and, therefore, their hot zones vary. The positionable temperature sensor allows the sensor to be positioned at the most accurate location for temperature measurement in the axillary region of a particular patient, even though the housing for the temperature sensor is visually positioned in the center of the axilla. The disk shape is easier to center in the axillary region and it is also easy to maintain that center position since the positionable temperature sensor may be positioned at different locations along the circumference of the housing for the temperature sensor.

In use, the temperature sensor is placed in contact with the axillary region to sense the temperature thereof. The temperature sensor produces an electronic signal that represents the body temperature obtained from the axillary region. The electronic signal of the sensor is then transmitted to a processor which converts the electronic signal into a temperature reading. The temperature reading is transmitted to the temperature display unit where the temperature is displayed in degrees Fahrenheit or Celsius. Axillary thermometers, along with features common to electronic thermometers, are described in U.S. Pat. No. 6,419,388 B2 to Lee, U.S. Pat. No. 6,402,371 B2 to Pompei et al., and U.S. Pat. No. 6,036,361 to Gregory et al., the contents of which are incorporated herein by reference.

BRIEF DESCRIPTION OF THE DRAWINGS

The foregoing and other features of the present invention will be more readily apparent from the following detailed description and drawings of illustrative embodiments of the invention in which.

DETAILED DESCRIPTION OF THE PREFERRED EMBODIMENTS

Figure 1:
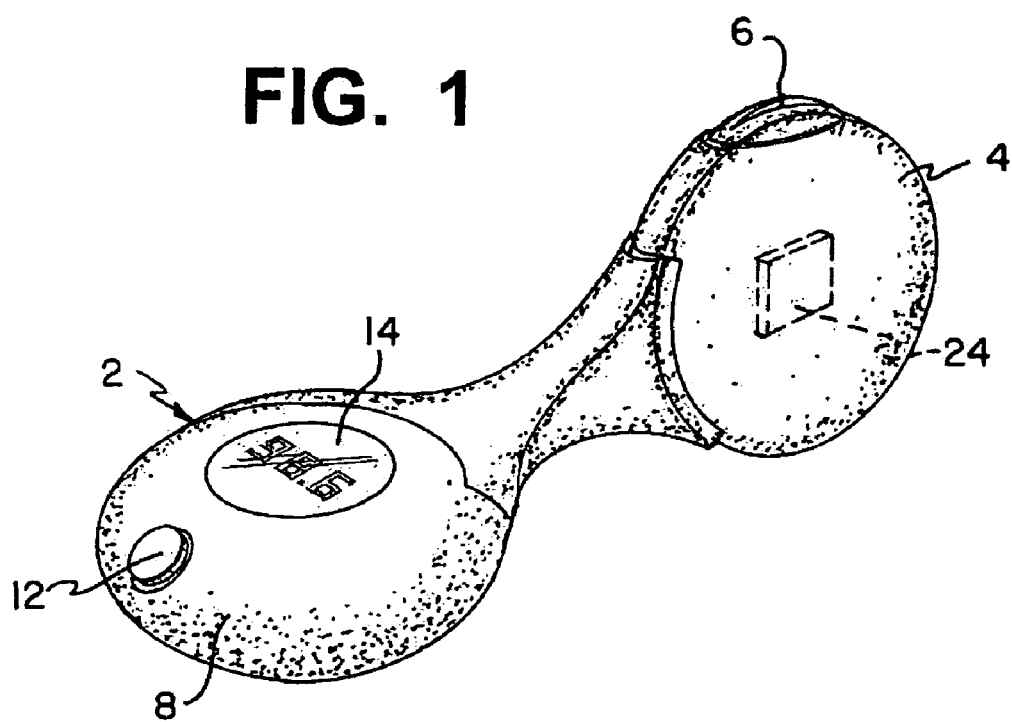
FIG. 1 is a perspective view of an axillary thermometer constructed in accordance with the present invention.

Referring now to the drawings, the present invention is directed to an axillary thermometer 2 that is site-specific in that it is designed to take the temperature of an individual via that individual's axillary region. The shape of the axillary thermometer 2 allows for improved placement into the axillary region and an improved ability to remain securely in place in the axillary region. This results in increased comfort for the patient, improved sensing capabilities, and a more accurate temperature determination.

In accordance with the preferred embodiment illustrated in FIG. 1, the axillary thermometer 2 includes a curved or disk-shaped housing 4 containing a temperature sensor 6 and the temperature sensing circuitry 24. Alternatively, the temperature sensing circuitry 24 may be external to the disk-shaped housing 4, or may be situated within a main housing 8. The temperature sensor 6 is situated on the top side, and along the circumference of, the disk-shaped housing 4. The temperature sensor 6, however, may be positioned along any portion of the circumference of the disk-shaped housing 4. The temperature sensor 6 and sensing area, or the axillary thermometer 2 itself, are washable so that repeated use on different individuals is possible without worrying about cross contamination. Alternatively, a disposable cover may be placed over the sensor 6 for sanitary purposes.

Proper positioning of the temperature sensor 6 in the axillary region is critical to accurate and fast temperature measurements. For this reason, the temperature sensor 6 is preferably designed to be arcuate or tubular in shape. An arcuate shape allows the temperature sensor 6 to conform to an individual's curves in the axillary region and to provide a large surface area for contacting the sensor 6 to the body, thus ensuring more accurate and faster temperature measurements than a shape which does not conform to the axillary contours. Similarly, a sensor having a tubular shape with a bend at the midpoint of the sensor (resembling a suitcase or briefcase handle) provides a large contacting surface area between the sensor and the axillary region while simultaneously providing increased comfort to the patient. Alternatively, the sensor may be designed to resemble conventional sensors having a conical nose shape.

The shape of the member housing the temperature sensor 6 also adds to the accuracy and speed with which a temperature is obtained because the disk-shaped housing 4 can more easily slide into the axillary region and yields more comfort for a patient than a similarly functioning square or finger-shaped member. The disk-shaped housing 4 for the temperature sensor 6 is designed to improve the overall temperature taking process. The shape naturally aligns itself within the axillary region and therefore improves the sensing capabilities of the axillary thermometer 2. Preferably, the thickness of the disk-shaped housing 4 for the temperature sensor 6 is greater at the top of the disk, where the temperature sensor 6 is located and where the apex of the armpit will lie, than the bottom of the disk, which is proximate to the ribcage when the axillary thermometer is placed within the axillary region. Such a design is preferred for the restless child who is constantly shifting their body positions because once the axillary thermometer 2 is in the axillary region and the arm is brought down over the axillary thermometer 2, the axillary thermometer 2 is more likely to stay in place than a conventional digital stick thermometer. Also, the disk shape provides for more comfort to the patient while a temperature is being taken.

A second disk-shaped member constituting the main housing 8 is connected to and extends perpendicularly from the disk-shaped housing 4 for the temperature sensor 6. A connecting member joint 10 is used to connect the main housing 8 to the disk-shaped housing 4 for the temperature sensor 6. The main housing 8 provides a large surface area that is ideal for handling the axillary thermometer 2 and contains the on/off button 12 and the temperature display unit 14. The on/off button 12 is pressed once to activate the temperature sensing mechanism and the temperature display unit 14. The axillary thermometer 2 is self-calibrated each time the on/off button 12 is pressed to turn the unit on to further ensure that accurate temperature measurements are taken. The axillary thermometer 2 is turned off by pressing the on/off 12 button a second time. The temperature display unit 14 provides a user with digitally displayed readouts of an individual's body temperature, and can be read simultaneously with the temperature taking process.

The main housing 8, wherein the on/off button 12 and temperature display unit 14 are preferably situated, is connected to the temperature sensing housing 4 via a connecting member joint 10. The connecting member joint 10 can be made from any rigid low thermal-conductivity material. The connecting member joint 10 can also be utilized as a handle for placement into the axillary region by placing one's fingers on the sides of the temperature display unit 14 and curving the fingers over and about the connecting member joint 16 so that the tips of the fingers are on the underside of the temperature display unit 14. Such a form of handling the axillary thermometer 2 is ideal for self-administered temperature determinations.

The complete housing of the thermometer, main housing 8 and disk-shaped housing 4 that holds the sensor 6, should be formed using a low thermal-conductivity material so that cooling of the patient's skin upon contact is minimized, and also so that the temperature sensor 6 does not experience improper fluctuations in temperature caused by interferences such as ambient air temperatures.

Figure 2:
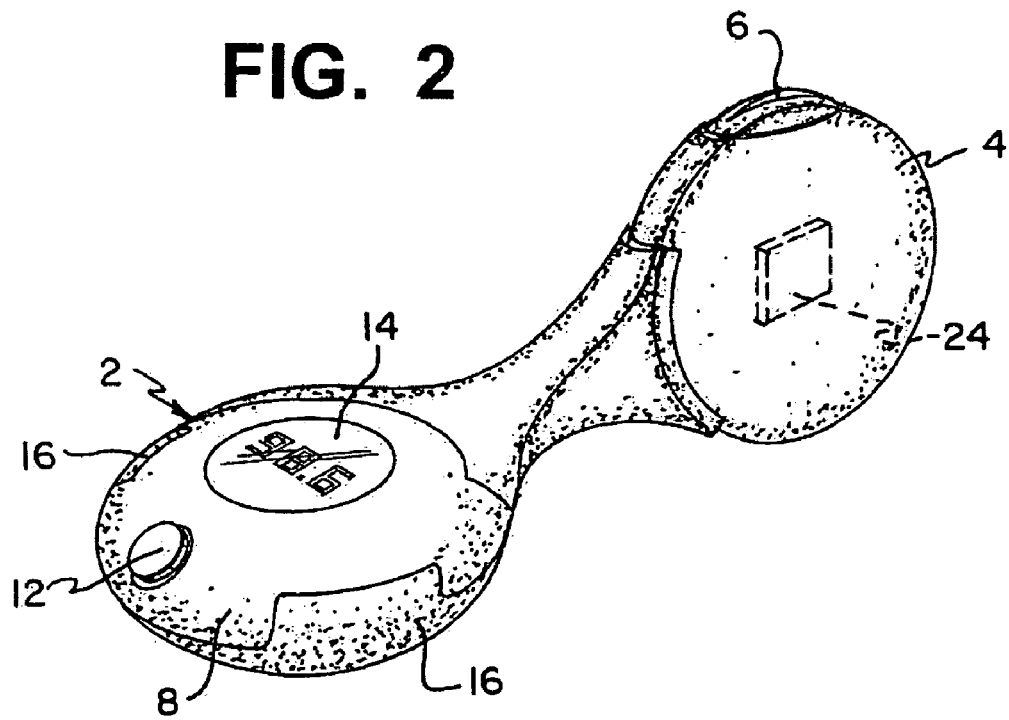
FIG. 2 is a perspective view of an alternative design of the axillary thermometer wherein the main housing of the thermometer includes gripping-pads.

In accordance with another embodiment of the present invention and as illustrated in FIG. 2, the axillary thermometer 2 is provided with gripping pads 16 and includes a disk-shaped housing 4 containing a temperature sensor 6 and the temperature sensing circuitry 24. A second disk-shaped member constituting the main housing 8 is connected to and extends perpendicularly from the disk-shaped housing 4 for the temperature sensor 6. The main housing 8 is the component provided with the gripping pads 16. The gripping pads 16 are affixed to the outer rim and top edges of the main housing 8 on opposite sides of the temperature display unit 14 and on/off button 12. The gripping pads 16 can be formed from any material that will allow for easy handling and a sure grip when the axillary thermometer 2 is being used, such as thin strips of rubber or neoprene. The gripping pads 16 can be affixed to the main housing 8 using an adhesive substance or can be manufactured with an adhesive substance previously disposed on the underside thereof. Optionally, the gripping pads 16 are formed onto the main housing 8 of the axillary thermometer 2 using a conventional overmolding or an injection molding process.

In accordance with another embodiment of the present invention, the axillary thermometer 2 includes a disk-shaped housing 4 containing a temperature sensor 6 and the temperature sensing circuitry 24, in which the connecting member joint 10, which joins the disk-shaped housing 4 for the temperature sensor 6 and the main housing of the thermometer 8, is molded from a flexible, rather than rigid, material such as rubber or a light plastic. The flexibility of the connecting member joint 10 increases the comfort to the individual the axillary thermometer 2 is being used on, and allows for improved contacting of the temperature sensor to the axillary region.

Figure 3:
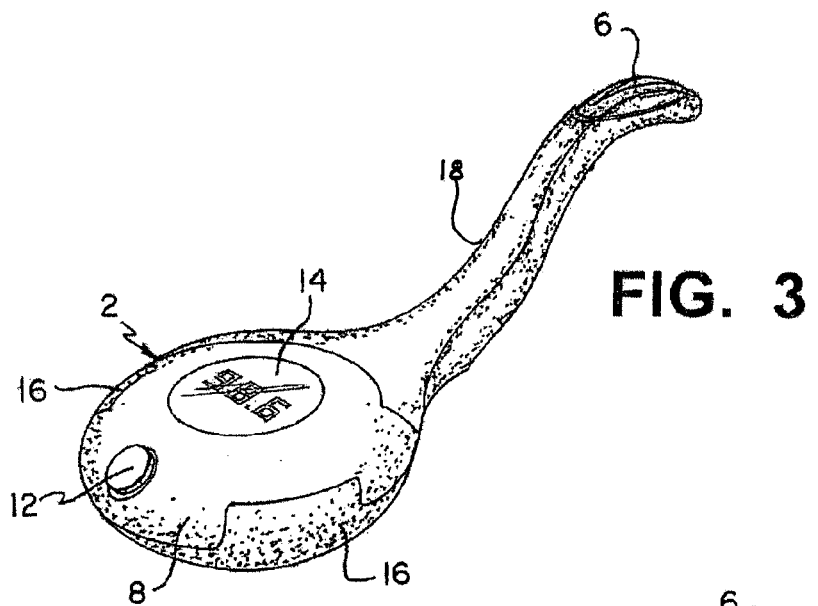
FIG. 3 is a perspective view of an alternative design of the axillary thermometer wherein an elongated arc-shaped probe houses the temperature sensor.

In accordance with another embodiment of the present invention and illustrated in FIG. 3, the axillary thermometer 2 comprises an arc-shaped elongated probe 18 that is provided with a temperature sensor 6 near the tip. A disk-shaped member constituting the main housing 8 of the thermometer is connected to the arc-shaped elongated probe 18. The arc-shaped elongated probe 18 allows for easy placement of the axillary thermometer 2 into the axillary region and is ideal for sliding into the axillary region through a shirtsleeve opening, so that disrobing is unnecessary.

Figure 5:
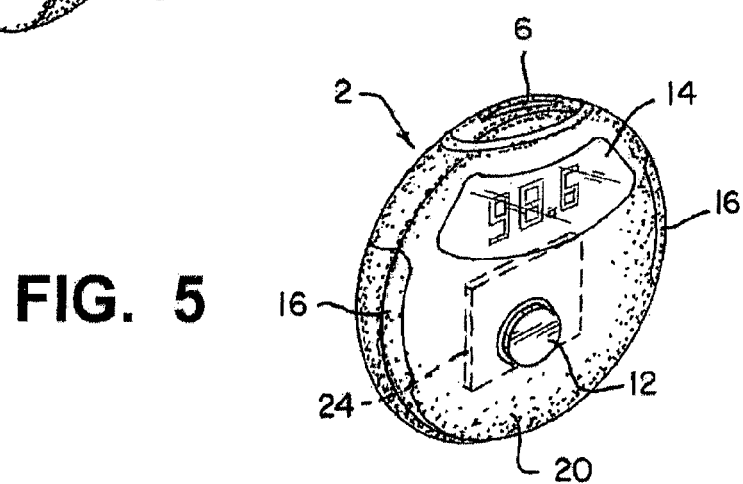
FIG. 5 is a perspective view of an alternative design of the axillary thermometer wherein the thermometer is a one-piece disk-shaped member having a temperature sensor along its circumference.

In accordance with another embodiment of the present invention and illustrated in FIG. 5, the axillary thermometer 2 comprises a one-piece housing 20 design that is disk-shaped. Within the one-piece housing 20 is the temperature sensing, temperature display, and power circuitry 24. The on/off button 12 and the temperature display unit 14 are provided on the top side of the one-piece housing 20. The temperature sensor 6 is provided along the circumference of the one-piece housing 20, directly above and proximate to the temperature display unit 14.

Figure 4:
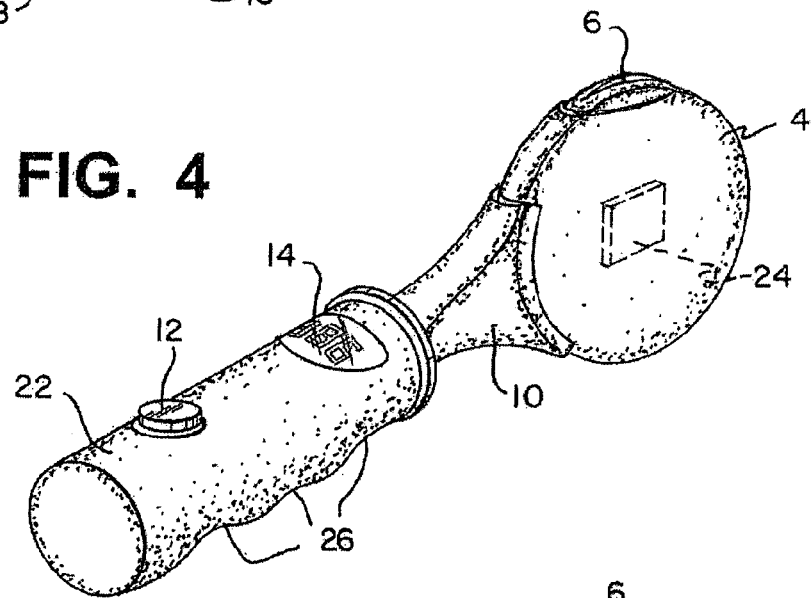
FIG. 4 is a perspective view of an alternative design of the axillary thermometer wherein the main housing is a rubber coated cylindrically shaped handle.

In accordance with another embodiment of the present invention and illustrated in FIG. 4, the axillary thermometer 2 comprises a disk-shaped housing 4 containing a temperature sensor 6 and the temperature sensing circuitry 24. Extending from the disk-shaped member housing the temperature sensor 6, via a connecting member joint 10, is a rubber coated cylindrically shaped handle 22 with comfort/finger grooves 26 on its underside and an on/off button 12 and temperature display unit 14 on its top side. Alternatively, the temperature sensing circuitry 24 may be contained within the cylindrically-shaped handle 22.

Figure 6:
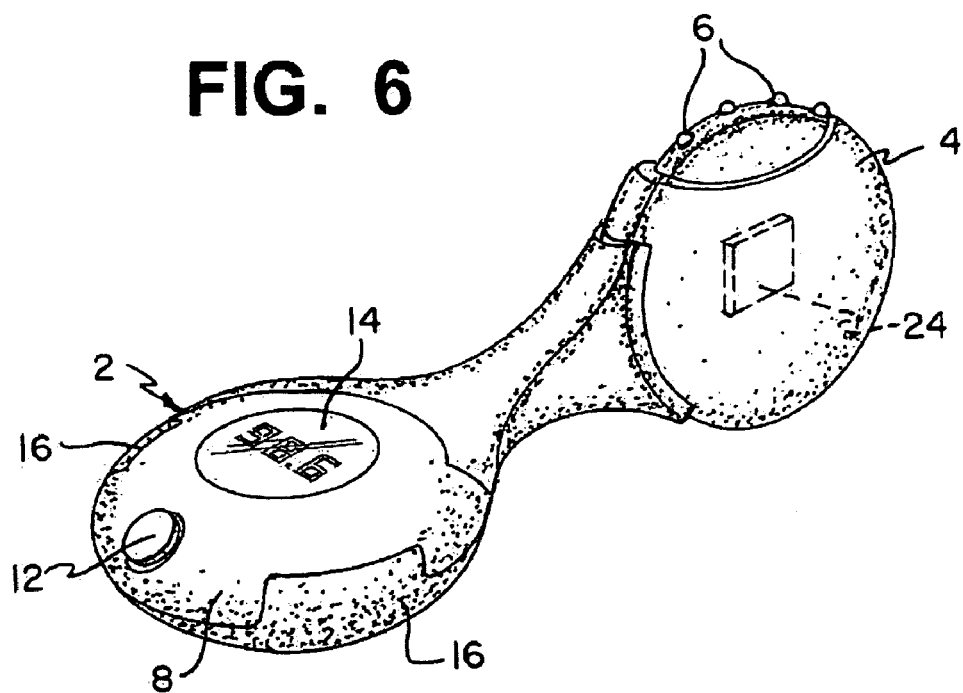
FIG. 6 is a perspective view of an alternative design of the axillary thermometer wherein the thermometer contains a multiple-sensor probe.

In accordance with another embodiment of the present invention and illustrated in FIG. 6, the axillary thermometer 2 is designed to be a multiple sensor thermometer 28. It has been determined that the temperature hot zone (the area of the axillary region which provides the most accurate temperature readings) for adults is more toward the rear of the axillary region than for a neonate. The multiple sensor thermometer 28 is provided with multiple temperature sensors 6 along a probe 30 that reads the temperature at multiple points and then displays the highest reading as the actual temperature. This design provides the most accurate temperature reading and eliminates human errors associated with lining up the sensor 6 in the hot zone of the axillary region.

Figure 7:
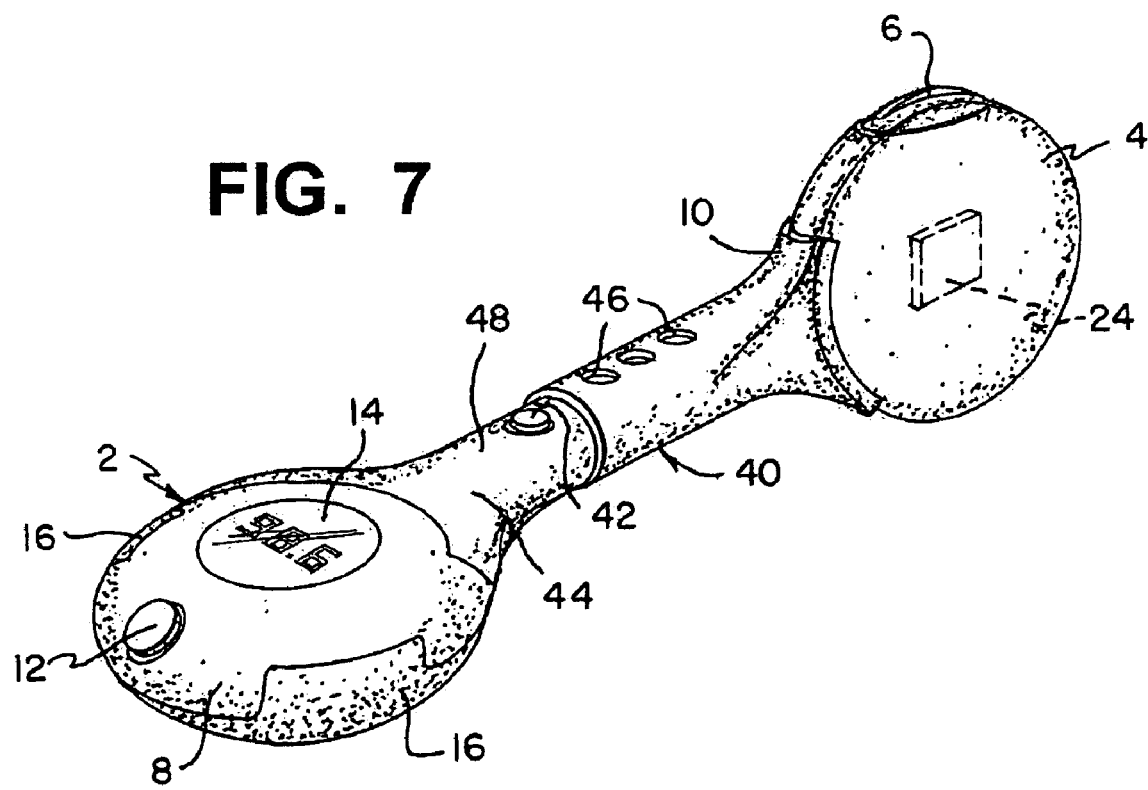
FIG. 7 is a perspective view of an alternative design of the axillary thermometer wherein the thermometer contains a lockable slide.

In accordance with another embodiment of the present invention, illustrated in FIG. 7, the axillary thermometer 2 is designed to be a constant depth thermometer. A constant depth thermometer design allows the thermometer to be inserted at a fixed depth every time, allowing for consistent temperature sensor 6 placement. The connecting member joint 10 is adapted to allow the disk-shaped member housing the temperature sensor 6 to slideably extend and retract with respect to the main housing 8 of the thermometer through the use of a lockable slide 40. The lockable slide 40 is unlocked by depressing a spring-loaded button 42 situated on a bottom portion 44 of the slide so that the spring-loaded button 42 does not project through holes 46 of an interconnected top portion 48, thereby allowing for extension or retraction of the connecting member joint 10. The lockable slide 40 is locked at a desired position by allowing the spring-loaded button 42 to protrude through a selected hole 46 of the top portion 48. The slideably positionable connecting member joint 10 allows a user to extend or retract the sensor housing to a predetermined position for a particular individual. For example, the different locking holes may correspond to different positions for a neonate or an adult. Also, having a slideably positionable connecting member joint 10 allows the user to position the housing for the temperature sensor 6 deeper within the axillary pocket, without having to remove the thermometer from the axillary region.

In accordance with another embodiment of the present invention, the axillary thermometer is designed so that the temperature sensor 6 is positionable along any point of the circumference of the disk-shaped housing 4. Different patients have varying dimensions within their axillary regions and, therefore, their hot zones vary. The positionable temperature sensor 6 allows the sensor to be positioned at the most accurate location for temperature measurement in the axillary region of a particular patient, even though the probe is visually positioned in the center of the axilla. The disk shape is easier to center in the axillary region and it is also easy to maintain that center position since the positionable temperature sensor may be positioned at different locations along the circumference of the housing for the temperature sensor 6.

In use, the temperature sensor 6 is placed in contact with the axillary region to sense the temperature thereof. The temperature sensor 6 produces an electronic signal that represents the body temperature obtained from the axillary region. The electronic signal of the sensor is then transmitted to a processor which converts the electronic signal into a temperature reading. The temperature reading is transmitted to the temperature display unit 14 where the temperature is displayed in degrees Fahrenheit or Celsius.

While the invention has been particularly shown and described with reference to preferred embodiments thereof, it will be understood by those skilled in the art that various changes in form and details may be made therein without departing from the spirit and scope of the invention.

What is claimed is:

1. An axillary thermometer for measuring the temperature of a patient comprising:
    a first disk-shaped member having a circumferential edge and an upper portion and lower portion;
    a second disk-shaped member including a circumferential edge and a top side and a bottom side, and disposed at an angle to the first disk-shaped member such that the top side is proximate the upper portion;
    the first disk-shaped member integrally connected to the second disk-shaped member via a connecting member joint;
    the first disk-shaped member further having at least one temperature sensor along the circumferential edge of the upper portion;
    the at least one temperature sensor being connected to at least one temperature sensing circuitry; and
    an actuation switch disposed on at least one of the first disk-shaped member and the second disk-shaped member and activating the calibration of the temperature sensing circuitry.

2. An axillary thermometer as in claim 1, wherein the at least one temperature sensor is arcuate-shaped.

3. An axillary thermometer as in claim 1, wherein the at least one temperature sensor is tubular-shaped.

4. An axillary thermometer as in claim 1, wherein the at least one temperature sensor is spherical-shaped.

5. An axillary thermometer as in claim 1, wherein the at least one temperature sensor is positionable at any of a plurality of positions along the circumferential edge of the first disk-shaped housing.

6. An axillary thermometer as in claim 1, wherein the temperature sensing circuitry is housed within the first member.

7. An axillary thermometer as in claim 1, wherein the temperature sensing circuitry is housed within the second member.

8. An axillary thermometer as in claim 1, wherein the temperature sensing circuitry is remote from at least one of the first and the second disk-shaped members.

9. An axillary thermometer as in claim 1, wherein the angle is substantially 90 degrees.

10. An axillary thermometer as in claim 1, wherein the first disk-shaped member is greater in thickness at the upper portion than at the lower portion.

11. An axillary thermometer as in claim 1, wherein one of the two disk-shaped members includes a display that is visible while the temperature of a patient is taken.

12. An axillary thermometer as in claim 1, wherein the connecting member joint is flexible.

13. An axillary thermometer as in claim 1, wherein the connecting member joint is slidably extendable and retractable.

14. An axillary thermometer as in claim 1, wherein the thermometer is waterproof.

15. The axillary thermometer of claim 1, wherein the first disk-shaped member is shaped to be disposed in the axillary region for taking the temperature of a patient.

* * * * *